US012565596B2

(12) United States Patent
Onodera et al.

(10) Patent No.: US 12,565,596 B2
(45) Date of Patent: Mar. 3, 2026

(54) POLYANILINE COMPOSITION, COATING FILM, POLYANILINE-CONTAINING POROUS BODY, AND METHOD FOR PRODUCING COATING FILM OR POLYANILINE-CONTAINING POROUS BODY

(71) Applicant: IDEMITSU KOSAN CO.,LTD., Tokyo (JP)

(72) Inventors: Shingo Onodera, Chiba (JP); Toru Bando, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 796 days.

(21) Appl. No.: 17/793,774

(22) PCT Filed: Jan. 14, 2021

(86) PCT No.: PCT/JP2021/000989

§ 371 (c)(1),
(2) Date: Jul. 19, 2022

(87) PCT Pub. No.: WO2021/149575

PCT Pub. Date: Jul. 29, 2021

(65) Prior Publication Data

US 2023/0054448 A1 Feb. 23, 2023

(30) Foreign Application Priority Data

Jan. 20, 2020 (JP) ................................ 2020-007035

(51) Int. Cl.

*C08G 73/02* (2006.01)
*C08K 5/13* (2006.01)
*C08K 5/42* (2006.01)
*C09D 139/00* (2006.01)
*C09D 179/02* (2006.01)
*H01B 1/12* (2006.01)
*H01B 5/14* (2006.01)

(52) U.S. Cl.

CPC ....... *C09D 179/02* (2013.01); *C08G 73/0266* (2013.01); *C08K 5/13* (2013.01); *C08K 5/42* (2013.01)

(58) Field of Classification Search

CPC ........ C08G 73/0266; C08K 5/13; C08K 5/42; C09D 139/00; H01B 1/128; H01B 5/14; C08L 79/02; C08L 101/12; C08L 21/02; C08L 33/00; C08L 71/02; C08L 2201/02

See application file for complete search history.

(56) References Cited

U.S. PATENT DOCUMENTS

| | | | | |
|---|---|---|---|---|
| 5,532,025 | A | 7/1996 | Kinlen et al. | |
| 5,993,694 | A | 11/1999 | Ito et al. | |
| 6,015,613 | A | 1/2000 | Kinlen et al. | |
| 9,384,866 | B2 | 7/2016 | Jibiki et al. | |
| 10,975,200 | B2 | 4/2021 | Onodera et al. | |
| 2009/0110811 | A1 * | 4/2009 | Ding | H01B 1/122 252/500 |
| 2019/0062501 | A1 | 2/2019 | Onodera et al. | |
| 2021/0403729 | A1 | 12/2021 | Onodera et al. | |

FOREIGN PATENT DOCUMENTS

| | | | |
|---|---|---|---|
| CN | 1127482 | A | 7/1996 |
| CN | 108701546 | A | 10/2018 |
| JP | 9-500837 | A | 1/1997 |
| JP | 9500837 | T2 | 1/1997 |
| JP | H10279798 | A | 10/1998 |
| JP | 2007231239 | A | 9/2007 |
| JP | 2009132882 | A | 6/2009 |
| JP | 2012062462 | A | 3/2012 |
| JP | 2019112499 | A | 7/2019 |
| KR | 20180118618 | A | 10/2018 |
| WO | 9503136 | A1 | 2/1995 |
| WO | 2009084419 | A1 | 7/2009 |
| WO | 2012/102017 | A1 | 8/2012 |
| WO | 2017150407 | A1 | 9/2017 |
| WO | 2020096028 | A1 | 5/2020 |

OTHER PUBLICATIONS

WO2009084419A1 Espacenet Translation (Year: 2009).*
JP2007231239A1 Espacenet Translation (Year: 2007).*
International Search report PCT/JP2021/000989 dated Mar. 30, 2021 (pp. 1-3) and International Preliminary report on patentability (pp. 1-7).
Search report in corresponding EP 21744042.9 dated Dec. 21, 2023 (pp. 1-10).
International Search Report dated Mar. 30, 2021 issued in corresponding PCT/JP2021/000989 application (3 pages).
Office Action in corresponding CN202180008313.X dated Jun. 9, 2023 (pp. 1-11).
Taiwan Intellectual Property Office Office Action dated Jul. 23, 2025 issued in corresponding application 110101795.
Korean Office Action dated Oct. 10, 2025 issued in corresponding application 10-2022-7017090.

* cited by examiner

*Primary Examiner* — Marc S Zimmer
*Assistant Examiner* — Virginia L Stonehocker
(74) *Attorney, Agent, or Firm* — Millen, White, Zelano & Branigan P.C.; Ryan R. Pool

(57) ABSTRACT

A polyaniline composition including a polyaniline complex composed of a polyaniline doped with a dopant, and a liquid polymer.

16 Claims, No Drawings

POLYANILINE COMPOSITION, COATING FILM, POLYANILINE-CONTAINING POROUS BODY, AND METHOD FOR PRODUCING COATING FILM OR POLYANILINE-CONTAINING POROUS BODY

TECHNICAL FIELD

The present invention relates to a polyaniline composition.

BACKGROUND ART

A polyaniline as one of conductive polymers has, in addition to the electric properties thereof, advantages and properties that it can be synthesized relatively easily from inexpensive aniline and exhibit excellent stability to oxygen or the like in the conductive state.

A polyaniline having excellent conductivity can be easily produced in the method described in Patent Document 1.

RELATED ART DOCUMENTS

Patent Documents

[Patent Document 1] WO2012/102017

SUMMARY OF THE INVENTION

In the prior art including Patent Document 1, possibility for further improvement has been found in terms of improving the mechanical strength of the polyaniline-containing material.

One of the objects of the present invention is to provide a polyaniline composition capable of improving the mechanical strength of a polyaniline-containing material, a coating film, a polyaniline-containing porous body, and a method for producing a coating film or a polyaniline-containing porous body.

As a result of extensive studies, the present inventors have found that the mechanical strength of a polyaniline-containing material produced using the polyaniline composition can be improved by a polyaniline composition comprising a polyaniline complex composed of a polyaniline doped with a dopant and a liquid polymer, and has completed the present invention.

According to the invention, the following polyaniline composition and the like are provided.

1. A polyaniline composition comprising
   a polyaniline complex composed of a polyaniline doped with a dopant, and
   a liquid polymer.
2. The polyaniline composition according to 1, wherein the dopant is a sulfosuccinic acid derivative represented by the following formula (III):

(III)

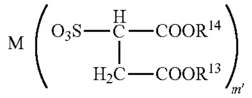

wherein in the formula (III), M is a hydrogen atom, an organic free radical or an inorganic free radical; m' is the valence of M; $R^{13}$ and $R^{14}$ are independently a hydrocarbon group or $—(R^{15}O)_r—R^{16}$ group; $R^{15}$ is independently a hydrocarbon group or a silylene group; $R^{16}$ is a hydrogen atom, a hydrocarbon group or $R^{17}{}_3Si—$ group; r is an integer of 1 or more; and $R^{17}$ is independently a hydrocarbon group.

3. The polyaniline composition according to 1 or 2, wherein the dopant is di-2-ethylhexylsulfosuccinic acid.
4. The polyaniline composition according to any one of 1 to 3, wherein the liquid polymer is one or more selected from the group consisting of polyglyceryl ether, acrylic polymer and liquid rubber.
5. The polyaniline composition according to any one of 1 to 4, wherein the amount of the liquid polymer based on 100 parts by mass of the polyaniline complex is 1 part by mass to 50 parts by mass.
6. The polyaniline composition according to any one of 1 to 5, which comprises a heat-resistant stabilizer.
7. The polyaniline composition according to any one of 1 to 6, which comprises a phenolic compound.
8. The polyaniline composition according to any one of 1 to 7, which comprises a permeability improver.
9. The polyaniline composition according to any one of 1 to 8, which comprises a solvent.
10. A coating film comprising the polyaniline composition according to any one of 1 to 8.
11. A polyaniline-containing porous body comprising a porous body and the polyaniline composition according to any one of 1 to 8 contained in the porous body.
12. A method for producing a coating film or a polyaniline-containing porous body comprising contacting the coating film according to 10 or the polyaniline-containing porous body according to 11 with a heat-resistant stabilizer-containing liquid.
13. The method for producing a coating film or a polyaniline-containing porous body according to 12, wherein the heat-resistant stabilizer-containing liquid comprises a liquid polymer.
14. The method for producing a coating film or a polyaniline-containing porous body according to 13, wherein the concentration of the liquid polymer in the heat-resistant stabilizer-containing liquid is 5% by mass to 20% by mass.

According to the present invention, there can be provided a polyaniline composition capable of improving the mechanical strength of a polyaniline-containing material, a coating film, a polyaniline-containing porous body, and a method for producing a coating film or a polyaniline-containing porous body.

MODE FOR CARRYING OUT THE INVENTION

Hereinafter, a mode for carrying out the invention will be described.

In this specification, "x to y" represents a numerical range of "x or more and y or less". The upper and lower limits described with respect to the numerical range may be arbitrarily combined.

An embodiment in which two or more individual embodiments of the present invention described below are combined is also an embodiment of the present invention.

[Polyaniline Composition]

A polyaniline composition according to an aspect of the present invention includes (A) a polyaniline complex composed of a polyaniline doped with a dopant, and (B) a liquid polymer.

According to the present aspect, it is possible to obtain an effect that the mechanical strength of a polyaniline-containing material (e.g., a coating film or a polyaniline-containing porous body) produced using the polyaniline composition can be improved. When a polymer, which is not a liquid polymer and is generally referred to as "resin", such an effect is hardly exhibited.

The "mechanical strength" herein can be evaluated by an elongation rate measured by, for example, a tensile test described in Examples.

In addition, since the liquid polymer is a polymer, that is, because the molecule thereof is larger compared with a monomer, bleed-out from the polyaniline-containing material is prevented. Further, since the liquid polymer is thermally stable, the mechanical strength of the polyaniline-containing material can be satisfactorily maintained even under high temperature.

Since the polyaniline complex is diluted by the polyaniline composition containing a liquid polymer, the conductivity of the polyaniline-containing material may be decreased slightly. However, in the long term, the conductivity of the polyaniline-containing material can be stably maintained by maintaining the mechanical strength of the polyaniline-containing material. Further, even in an application in which conductivity is not required, an effect of maintaining mechanical strength of the polyaniline-containing material is obtained.

[Component (A): Polyaniline Complex]

The polyaniline complex (the component (A)) is a complex of a polyaniline and a dopant, and is composed of a polyaniline doped with a dopant.

[Polyaniline]

The weight average molecular weight and the molecular weight distribution of the polyaniline are not particularly limited.

In one embodiment, the weight average molecular weight of the polyaniline is 5,000 or more, 10,000 or more, 20,000 or more, 30,000 or more, 40,000 or more, or 52,000 or more, and is also 1,000,000 or less, 800,000 or less, 500,000 or less, 300,000 or less, or 200,000 or less.

In one embodiment, the molecular weight distribution of the polyaniline is 20.0 or less, 10.0 or less, 5.0 or less, 4.5 or less, 4.0 or less, or 3.6 or less. The lower limit is not particularly limited, and is, for example, 1.5 or more. In view of conductivity, it is preferable that the molecular weight distribution is smaller, however, in view of solubility in a solvent, it is preferable that the molecular weight distribution is wider in some cases.

The weight average molecular weight and the molecular weight distribution are measured with polystyrene conversion by using gel permeation chromatography (GPC).

The polyaniline may or may not have a substituent.

In one embodiment, the polyaniline is an unsubstituted polyaniline. The unsubstituted polyaniline is excellent in versatility and economics.

In one embodiment, the polyaniline is a polyaniline having a substituent. Examples of the substituent in this case include a linear or branched hydrocarbon group such as a methyl group, an ethyl group, a hexyl group and an octyl group; an alkoxy group such as a methoxy group and an ethoxy group; an aryloxy group such as a phenoxy group; and a halogenated hydrocarbon group such as a trifluoromethyl group ($—CF_3$ group).

[Dopant]

In the polyaniline complex, the dopant can function as a proton donor.

Examples of the dopant include, for example, Bronsted acid or Bronsted acid ion arising from a salt of Bronsted acid, preferably an organic acid or an organic acid ion arising from a salt of an organic acid, and more preferably the organic acid ion arising from a compound represented by the following formula (I).

In the present specification, even when it may be a case that the dopant is expressed as the specific acid and a case that the dopant is expressed as the specific salt, the specific acid ion resulting from the specific acid or the specific salt may be doped into the polyaniline in both of the cases.

$$M(XAR_n)_m \quad (I)$$

M in the formula (I) is a hydrogen atom, an organic free radical or an inorganic free radical.

Examples of the organic free radical include, for example, a pyridinium group, an imidazolium group, and an anilinium group. Examples of the inorganic free radical include lithium, sodium, potassium, cesium, ammonium, calcium, magnesium, iron, and the like.

X in the formula (I) is an anionic group, and examples thereof include $—SO_3^-$ group, $—PO_3^{2-}$ group, $—PO_2(OH)^-$ group, $—OPO_3^{2-}$ group, $—OPO_2(OH)^-$ group, $—COO^-$ group and the like, and preferably $—SO_3^-$ group.

A in the formula (I) is a substituted or unsubstituted hydrocarbon group (having, for example, 1 to 20 carbon atoms).

The hydrocarbon group is a chain or cyclic saturated aliphatic hydrocarbon group, a chain or cyclic unsaturated aliphatic hydrocarbon group, or an aromatic hydrocarbon group.

Examples of the chain saturated aliphatic hydrocarbon group (having, for example, 1 to 20 carbon atoms) include a linear or branched alkyl group. Examples of the cyclic saturated aliphatic hydrocarbon group (having, for example, 3 to 20 carbon atoms) include a cycloalkyl group such as a cyclopentyl group, a cyclohexyl group, a cycloheptyl group, a cyclooctyl group and the like. The cyclic saturated aliphatic hydrocarbon group may be one in which the plurality of cyclic saturated aliphatic hydrocarbon groups are condensed. Examples thereof include a norbornyl group, an adamantyl group, a fused adamantyl group and the like. Examples of the chain unsaturated aliphatic hydrocarbon group (having, for example, 2 to 20 carbon atoms) include a linear or branched alkenyl group. Examples of the cyclic unsaturation aliphatic hydrocarbon group (having, for example, 3 to 20 carbon atoms) include a cyclic alkenyl group. Examples of the aromatic hydrocarbon group (having, for example, 6 to 20 carbon atoms) include a phenyl group, a naphthyl group, an anthracenyl group and the like.

When A is a substituted hydrocarbon group, a substituent is an alkyl group (having, for example, 1 to 20 carbon atoms), a cycloalkyl group (having, for example, 3 to 20 carbon atoms), a vinyl group, an allyl group, an aryl group (having, for example, 6 to 20 carbon atoms), an alkoxy group (having, for example, 1 to 20 carbon atoms), a halogen group, a hydroxy group, an amino group, an imino group, a nitro group, a silyl group or an ester bond-containing group.

R in the formula (I) is bonded with A, and is a substituent represented by —H, $—R^1$, $—OR^1$, $—COR^1$, $—COOR^1$, $—(C{=}O)—(COR^1)$, or $—(C{=}O)—(COOR^1)$, and $R^1$ is a hydrocarbon group, a silyl group, an alkylsilyl group, $—(R^2O)x\text{-}R^3$ group, or $—(OSiR^3_2)x\text{-}OR^3$ group which may contain a substituent. $R^2$ is an alkylene group, $R^3$ is a hydrocarbon group, and x is an integer of 1 or more. When x is 2 or more, the plurality of $R^2$'s may independently be the same as or different from each other, and the plurality of $R^3$'s may independently be the same as or different from each other.

Examples of the hydrocarbon group (having, for example, 1 to 20 carbon atoms) for $R^1$ include a methyl group, an ethyl group, a butyl group, a pentyl group, a hexyl group, a heptyl group, an octyl group, a nonyl group, a decyl group, a dodecyl group, a pentadecyl group, an eicosanyl group or the like. The hydrocarbon group may be linear or may be branched.

The substituent of the hydrocarbon group is an alkyl group (having, for example, 1 to 20 carbon atoms), a cycloalkyl group (having, for example, 3 to 20 carbon atoms), a vinyl group, an allyl group, an aryl group (having, for example, 6 to 20 carbon atoms), an alkoxy group (having, for example, 1 to 20 carbon atoms), a halogen group, a hydroxy group, an amino group, an imino group, a nitro group, or an ester bond-containing group. The hydrocarbon group for $R^3$ is also the same as defined in that of $R^1$.

The alkylene group (having, for example, 1 to 20 carbon atoms) for $R^2$ include a methylene group, an ethylene group, a propylene group, and the like.

n in the formula (I) is an integer of 1 or more. When n is 2 or more, the plurality of R's may be the same as or different from each other.

m in the formula (I) is the valence of M/the valence of X.

As the compound represented by the formula (I), dialkylbenzenesulfonic acid, dialkylnaphthalenesulfonic acid, or a compound containing two or more ester bonds are preferable.

As the compound containing 2 or more ester bonds, a sulfophthalic acid ester or a compound represented by the following formula (II) is more preferable.

(II)

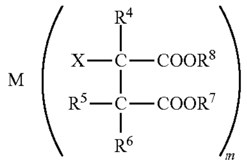

In the formula (II), M and X are the same as those in the formula (I). X is preferably $—SO_3^-$ group.

$R^4$, $R^5$ and $R^6$ are independently a hydrogen atom, a hydrocarbon group or $R^9{}_3Si$-group. The three $R^9$'s is independently a hydrocarbon group.

When $R^4$, $R^5$ and $R^6$ are the hydrocarbon group, examples of the hydrocarbon group include a linear or branched alkyl group having 1 to 24 carbon atoms, an aryl group (having, for example, 6 to 20 carbon atoms), an alkylaryl group (having, for example, 7 to 20 carbon atoms), and the like.

The hydrocarbon group for $R^9$ are the same as those of $R^4$, $R^5$ and $R^6$.

$R^7$ and $R^8$ in the formula (II) are independently a hydrocarbon group or $—(R^{10}O)_q—R^{11}$ group. $R^{10}$ is a hydrocarbon group or a silylene group, $R^{11}$ is a hydrogen atom, a hydrocarbon group or a $R^{12}{}_3Si—$, and q is an integer of 1 or more. The three $R^{12}$'s is independently a hydrocarbon group.

When $R^7$ and $R^8$ are the hydrocarbon group, the hydrocarbon group includes a linear or branched alkyl group having 1 to 24 carbon atoms, preferably 4 or more carbon atoms, an aryl group (having, for example, 6 to 20 carbon atoms), an alkylaryl group (having, for example, 7 to 20 carbon atoms) and the like, and specific examples thereof include a butyl group, a pentyl group, a hexyl group, an octyl group, a decyl group and the like, all of which are linear or branched.

The hydrocarbon group in the case where $R^{10}$ is a hydrocarbon group in $R^7$ and $R^8$ includes, for example, a linear or branched alkylene group having 1 to 24 carbon atoms, an arylene group (having, for example, 6 to 20 carbon atoms), an alkylarylene group (having, for example, 7 to 20 carbon atoms), or an arylalkylene group (having, for example, 7 to 20 carbon atoms). In addition, the hydrocarbon group in the case where $R^{11}$ and $R^{12}$ are a hydrocarbon group in $R^7$ and $R^8$ is the same as defined in those in $R^4$, $R^5$ and $R^6$, and q is preferably 1 to 10.

Specific examples of the compound represented by the formula (II) when $R^7$ and $R^8$ are $—(R^{10}O)_q—R^{11}$ group are the two compounds represented by the following formulas.

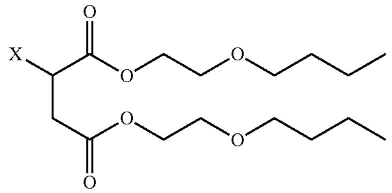

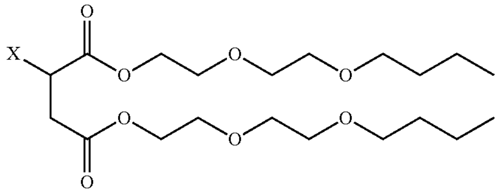

wherein in the formulas, X is the same as defined in that in the formula (I).

It is more preferable that the compound represented by the formula (II) is a sulfosuccinic acid derivative represented by the following formula (III).

(III)

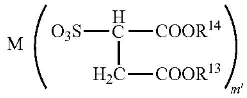

In the formula (III), M is the same as defined in that in the formula (I). m' is the valence of M.

$R^{13}$ and $R^{14}$ are independently a hydrocarbon group or $—(R^{15}O)_r—R^{16}$ group. $R^{15}$ is a hydrocarbon group or a silylene group, $R^{16}$ is a hydrogen atom, a hydrocarbon group or a $R^{17}{}_3Si—$ group, and r is an integer of 1 or more. The three $R^{17}$'s is independently a hydrocarbon group. When r is 2 or more, the plurality of $R^{15}$'s may independently be the same as or different from each other.

The hydrocarbon group when $R^{13}$ and $R^{14}$ are a hydrocarbon group is the same as defined in $R^7$ and $R^8$.

The hydrocarbon group when $R^{15}$ is a hydrocarbon group in $R^{13}$ and $R^{14}$ is the same as defined in that of the above $R^{10}$. In addition, the hydrocarbon group when $R^{16}$ and $R^{17}$ are the hydrocarbon group in $R^{13}$ and $R^{14}$ is the same as those of $R^4$, $R^5$ and $R^6$. r is preferably 1 to 10.

When $R^{13}$ and $R^{14}$ are $—(R^{15}O)_r—R^{16}$ group, specific examples thereof are the same as defined in $—(R^{10}O)_q—R^{11}$ in $R^7$ and $R^8$.

The hydrocarbon group for $R^{13}$ and $R^{14}$ is the same as defined in that of $R^7$ and $R^8$, and is preferably a butyl group, a hexyl group, a 2-ethylhexyl group, a decyl group.

As the compound represented by the formula (I), di-2-ethylhexylsulfosuccinic acid and sodium di-2-ethylhexylsulfosuccinate are preferable.

A dopant being doped into the substituted or unsubstituted polyaniline in the polyaniline complex can be confirmed by ultraviolet/visible/near-infrared spectroscopy or X-ray photoelectron spectroscopy, and the dopant can be used without any particular chemical structural limitation as long as the dopant has enough acidity to generate carriers in the polyaniline.

The doping ratio of the dopant to the polyaniline is preferably 0.35 or more and 0.65 or less, more preferably 0.42 or more and 0.60 or less, still more preferably 0.43 or more and 0.57 or less, and particularly preferably 0.44 or more and 0.55 or less.

The doping ratio is defined as (the number of moles of the dopant doped into the polyaniline)/(the number of moles of monomer units of the polyaniline). For example, the doping ratio of 0.5 for a polyaniline complex containing an unsubstituted polyaniline and a dopant means that two monomer unit moleculars of polyaniline are doped with one dopant.

The doping ratio can be calculated if the number of moles of the dopant and the monomer unit of the polyaniline in the polyaniline complex can be measured. For example, when the dopant is an organic sulfonic acid, the number of moles of sulfur atoms derived from the dopant and the number of moles of nitrogen atoms derived from the monomer unit of the polyaniline are quantified by an organic element analysis method, and the doping ratio can be calculated by taking the ratio of these values. Provided that, the method of calculating the doping ratio is not limited to this means.

The polyaniline complex can be produced in a well-known production method. For example, it can be prepared by chemical oxidative polymerization of a substituted or unsubstituted aniline in a solution containing a dopant, a phosphoric acid, and an emulsifier different from the dopant and having two liquid phases. It can also be prepared by adding an oxidative polymerization agent to a solution containing a substituted or unsubstituted aniline, a dopant, a phosphoric acid, and an emulsifier different from the dopant and having two liquid phases.

The "solution having two liquid phases" means a state where two incompatible liquid phases are present in a solution. For example, it means a state in which "a phase of a high polarity solvent" and "a phase of a low polarity solvent" are present in the solution.

The "solution having two liquid phases" also includes a state in which one of the liquid phases is a continuous phase and the other liquid phase is a dispersed phase. For example, it includes a state in which the "phase of the high polarity solvent" is a continuous phase and the "phase of the low polarity solvent" is a dispersed phase, and a state in which the "phase of the low polarity solvent" is a continuous phase and the "phase of the high polarity solvent" is a dispersed phase.

Water is preferable as the high polarity solvent used in the method for producing the polyaniline complex, and, for example, an aromatic hydrocarbon such as a toluene and a xylene are preferable as the low polarity solvent.

As the emulsifier, any of an ionic emulsifier in which a hydropholic moiety is ionic and a non-ionic emulsifier in which a hydropholic moiety is non-ionic can be used, and one may be used, or two or more emulsifiers may be used in a mixture.

The oxidizing agent used in the chemical oxidative polymerization may be a peroxide such as sodium persulfate, potassium persulfate, ammonium persulfate and hydrogen peroxide; ammonium dichromate, ammonium perchlorate, potassium iron (III) sulfate, iron (III) trichloride, manganese dioxide, iodic acid, potassium permanganate, iron para-toluenesulfonate, or the like, and is preferably a persulfate such as ammonium persulfate.

These may be used alone, or two or more kinds thereof may be used in combination.

[Component (B): Liquid Polymer]

The liquid polymer (the component (B)) is a liquid polymer at 30° C. The liquid polymer need not be liquid in the polyaniline composition.

In one embodiment, the viscosity of the liquid polymer at 30° C. is 0.01 Pa·s or more, 0.03 Pa·s or more, 0.05 Pa·s or more, or 0.07 Pa·s or more, and is also 1,000 Pa·s or less, 800 Pa·s or less, 500 Pa·s or less, 300 Pa·s or less, 200 Pa·s or less, or 150 Pa·s or less.

The viscosity of the liquid polymer is a value measured by the method described in the Examples.

The molecular weight of the liquid polymer is not particularly limited, and can be appropriately selected so that the liquid polymer is liquid at 30° C. Further, the molecular weight of the liquid polymer can be appropriately selected so that the viscosity thereof and the fluidity thereof fall within the range described above.

In one embodiment, the liquid polymer is one or more selected from the group consisting of a polyglyceryl ether, an acrylic polymer and a liquid rubber. As a result, the effect of the present invention is satisfactorily exhibited.

The polyglyceryl ether is not particularly limited, and examples thereof include a polyoxyalkylene polyglyceryl ether such as a polyoxyethylene polyglyceryl ether, a polyoxypropylene polyglyceryl ether.

In one embodiment, the molecular weight of the polyglyceryl ether is 300 or more, 500 or more, or 750 or more, and is also 5,000 or less, 3,000 or less, or 1,600 or less.

The molecular weight of the polyglyceryl ether is preferably 350 or more, 800 or more, or 850 or more, more preferably 900 or more, and is also preferably 1,900 or less, or 1,800 or less, more preferably 1,700 or less. As a result, effects of remarkably improving the mechanical strength can be obtained.

The value of the molecular weight for the polyglyceryl ether may be applied to any of the weight average molecular weight Mw of the polyglyceryl ether and the number average molecular weight Mn of the polyglyceryl ether.

In one embodiment, the weight average molecular weight Mw of the acrylic polymer is 300 or more, 750 or more, or 1,600 or more, and is also 6,000 or less, 4,000 or less, or 3,000 or less.

The "liquid rubber" refers to a liquid polymer which is liquid as a raw material polymer and exhibits rubber elasticity after crosslinking or chain extension reaction. The term "after crosslinking or chain extension reaction" may be any of after crosslinking, after chain extension reaction, and after crosslinking and chain extension reaction.

In the polyaniline composition according to one embodiment, the liquid rubber is one in which the crosslinking or chain extension reaction is completed, is one in the middle of a crosslinking or chain extension reaction, or is one in which the crosslinking or chain extension reaction is not initiated. When the liquid rubber is one in which the crosslinking or chain extension reaction is completed, or is one in the middle of a crosslinking or chain extension reaction, the values such as the viscosity and the average molecular weight of the liquid polymer shown in the present specification correspond to the values measured for the liquid rubber in which the crosslinking or chain extension reaction is not initiated. In one embodiment, at the time of blending into the composition, the crosslinking or chain extension reaction of the liquid rubber may not be initiated, and the crosslinking or chain extension reaction of the liquid rubber may be initiated in the composition.

Examples of the liquid rubber include a polybutadiene, a polyisoprene, a polystyrene butadiene, a polyacrylonitrile-butadiene, a polysilicone, a hydroxyl group-terminated liquid polyolefin, and the like.

In one embodiment, the number average molecular weight Mn of the polybutadiene is 300 or more, 700 or more, or 1,200 or more, and is also 6,000 or less, 4,000 or less, or 2,800 or less.

In one embodiment, the number average molecular weight Mn of the polyisoprene is 300 or more, 1,000 or more, or 2,000 or more, and is also 6,000 or less, 4,000 or less, or 3,000 or less.

Examples of the hydroxyl group-terminated liquid polyolefin include a polyolefin having a hydroxyl group at the terminal of the polymer main chain, and the like.

In one embodiment, the number average molecular weight Mn of the hydroxyl group-terminated liquid polyolefin is 300 or more, 1,000 or more, or 2,000 or more, and is also 6,000 or less, 4,000 or less, or 3,000 or less.

In one embodiment, the smaller the number of the hydroxyl group of the liquid polymer, the better the solubility of the liquid polymer in an organic solvent, and the more easily the liquid polymer and the polyaniline complex are uniformly mixed. As a result, the effect of the present invention is satisfactorily exhibited.

In one embodiment, the amount of the liquid polymer based on 100 parts by mass of the polyaniline complex is 0.1 parts by mass or more, 0.5 parts by mass or more, 1 part by mass or more, 1.5 parts by mass or more, or 2 parts by mass or more, and is also 500 parts by mass or less, 300 parts by mass or less, 100 parts by mass or less, 80 parts by mass or less, 50 parts by mass or less, 30 parts by mass or less, or 20 parts by mass or less.

In one embodiment, the higher the amount of the above liquid polymer, the higher the mechanical strength of the polyaniline-containing material, and the smaller the amount thereof, the more easily the conductivity is exhibited by the polyaniline complex. Therefore, the amount of the above liquid polymer can be appropriately selected depending on the purpose and the application.

The amount of the liquid polymer based on 100 parts by mass of the polyaniline complex is preferably 6 parts by mass or more, 7 parts by mass or more, 8 parts by mass or more, 9 parts by mass or more, or 10 parts by mass or more. As a result, the effect of remarkably improving the mechanical strength can be obtained. In particular, when the polyglyceryl ether is used as the liquid polymer, the mechanical strength is remarkably improved at such a high amount.

[Other Component]

The polyaniline composition may further include other component other than the component (A) and the component (B) described above. Examples of the other component include a solvent (a component (C)), a permeability improver (a component (D)), a heat-resistant stabilizer (a component (E)), a phenolic compound (a component (F)), an inorganic filler (a component (G)), a binder resin (a component (H)), and the like. The other component may be used alone, or two or more kinds thereof may be used in combination.

[Component (C): Solvent]

The polyaniline composition can be used, by including the solvent (the component (C)), as a coating liquid for forming a coating film, a liquid (an impregnation liquid) for being contained in (penetrating into) a porous body, or the like. By drying the component (C), a polyaniline-containing material such as a coating film or a polyaniline-containing porous body can be produced. The solvent is not particularly limited as long as it dissolves the polyaniline. Provided that, the components (D) to (F) described later are not included therein. The solvent is preferably an organic solvent. Examples thereof include an aromatic hydrocarbon, an aliphatic hydrocarbon, an alcohol, a ketone, an ether, and an ester. These may be used alone, or two or more kinds thereof may be used in combination.

The organic solvent may be a water-soluble organic solvent, and may be an organic solvent which is substantially immiscible with water (a water-immiscible organic solvent).

As the water-soluble organic solvent, a highly polar organic solvent can be used, and may be a protic polar solvent or an aprotic polar solvent. Examples thereof include alcohols such as methanol, ethanol, isopropyl alcohol, 1-butanol, 2-butanol, 2-pentanol, benzyl alcohol and alkoxy alcohols (e.g., 1-methoxy-2-propanol, 3-methoxy-1-butanol); ketones such as acetone, methyl ethyl ketone and methyl isobutyl ketone; ethers such as tetrahydrofuran, dioxane, diethyl ether and ethylene glycol mono tert-butyl ether; aprotic polar solvents such as N-methylpyrrolidone, and the like.

As the water immiscible organic solvent, a low polarity organic solvent can be used, and includes, for example, a hydrocarbon-based solvent such as hexane, heptane, octane, isooctane, nonane, isononane, decane, benzene, toluene, xylene, ethylbenzene and tetraline; a halogen-containing solvent such as methylene chloride, chloroform, carbon tetrachloride, dichloroethane and tetrachloroethane; an ester-based solvent such as ethyl acetate, isobutyl acetate and n-butyl acetate; a ketone-based solvent such as methyl isobutyl ketone (MIBK), methyl ethyl ketone, cyclopentanone and cyclohexanone; a ether-based solvent such as cyclopentyl methyl ether, or the like. Further, an isoparaffin-based solvent containing one or two or more kinds of isoparaffins may be used as the hydrocarbon-based solvent.

When the organic solvent is used as the solvent, it is preferable to use a mixed organic solvent in which a water-immiscible organic solvent and a water-soluble organic solvent are mixed in a ratio of 99 to 1:1 to 99 (mass ratio), because it can be prevented that gels or the like are generated during storage, and because long-term storage is possible.

The mixed organic solvent may contain one or two or more kinds of water-immiscible organic solvents, and may contain one or two or more kinds of water-soluble organic solvents.

In one embodiment, the concentration of the component (A) based on the solvent [component (A)×100/(component (A)+component (C))] is 0.01% by mass or more, 0.03% by mass or more, or 0.05% by mass or more, and is also 15.0% by mass or less, 10.0% by mass or less, 5.0% by mass or less, 1.0% by mass or less, 0.5% by mass or less, 0.3% by mass or less, or 0.1% by mass or less.

When the polyaniline composition contains the component (D) and the component (E) described later, the concentration of the component (A) based on the solvent is calculated by the following formula, but the boiling point is determined only by the component (C).

Concentration of the component (*A*) (% by mass)= component (*A*)×100/(component (*A*)+component (*C*)+component (*D*)+component (*E*))

[Component (D): Permeability Improver]

The permeability improver (the component (D)) exhibits, for example, a function of improving the permeability of the polyaniline composition into the inside of the porous body when the polyaniline composition is contained in the porous body. As a result, it is possible to improve the amount of adhesion of the polyaniline composition and the uniformity of adhesion thereof inside the porous body. When the polyaniline composition is contained in the porous body, it is preferable that the polyaniline composition contains the component (C). After being contained in the porous body, the component (C) can be removed by drying.

Further, the component (D) may be mixed with the component (C), and they may be used as a mixed solvent. In such a case, the concentration of the component (A) based on the solvent is calculated by using based on the combined mass of the component (C) and the component (D).

As the component (D), an acid or a salt can be used. The acid or the salt is not particularly limited. Here, the component (D) does not include the components (E) and (F) described later. The acid is an Arrhenius acid or a Bronsted acid having an acidic group ($H^+$). Examples thereof include sulfonic acid and salt thereof, phosphoric acid and salt thereof, phosphate ester and salt thereof, carboxylic acid and salt thereof, amino acid and salt thereof, boric acid and salt thereof, boronic acid and salt thereof, and the like.

As the salt, an ammonium salt, an alkali metal salt (e.g., a sodium salt, a lithium salt, a potassium salt or the like) of the corresponding acid can be used.

Specific examples include phosphoric acid and salt thereof; monomethyl phosphate, dimethyl phosphate, mixture of monomethyl phosphate and dimethyl phosphate, and salt thereof; monoethyl phosphate, diethyl phosphate, mixture of monoethyl phosphate and diethyl phosphate, and salt thereof; monoisopropyl phosphate, diisopropyl phosphate, mixture of monoisopropyl phosphate and diisopropyl phosphate, and salt thereof; monobutyl phosphate, dibutyl phosphate, mixture of monobutyl phosphate and dibutyl phosphate, and salt thereof; mono(2-ethylhexyl) phosphate, di(2-ethylhexyl) phosphate, mixture of mono(2-ethylhexyl) phosphate and di(2-ethylhexyl) phosphate, and salt thereof; acetic acid and salt thereof; propionic acid and salt thereof; butyric acid and salt thereof; DL-2-methylbutyric acid and salt thereof; 2-ethylhexanoic acid and salt thereof; 3,5,5-trimethylhexanoic acid and salt thereof; myristic acid and salt thereof; 2-methylvaleric acid and salt thereof; adipic acid and salt thereof; glycine and salt thereof; β-alanine and salt thereof; DL-alanine and salt thereof; DL-valine and salt thereof; (±)-10-camphorsulfonic acid and salt thereof; dioctyl sulfosuccinate and salt thereof; 2-[4-(2-hydroxyethyl)-1-biperazinyl]ethanesulfonic acid and salt thereof; boric acid and borate; dodecylbenzenesulfonic acid and dodecylbenzenesulfonate; phenylboronic acid and phenylboronate, and the like.

These may be used alone, or two or more kinds thereof may be used in combination.

Of the above, phosphoric acid ester and salt thereof, carboxylic acid and salt thereof, carboxylic acid ester and salt thereof, amino acid and salt thereof, and the like may be used. It may be configured to use an acid different from the heat-resistant stabilizer (the component (E)).

The component (D) preferably has the solubility parameter (SP value) of 13.0 $(cal/cm^3)^{1/2}$ or less, more preferably 11.0 $(cal/cm^3)^{1/2}$ or less. Further, it may be 10.0 $(cal/cm^3)^{1/2}$ or less. The SP value thereof is usually 0 $(cal/cm^3)^{1/2}$ or more.

The SP value is calculated by using Fedors method described in "Polymer Engineering & Science", 1974, vol. 14, pp. 147-154.

The component (D) is preferably an acid having a hydrophobic group.

Examples of the hydrophobic group include a linear alkyl group, a branched alkyl group, an alkylphenyl group, an alkylnaphthyl group, and the like. The alkyl group of the linear alkyl group and the branched alkyl group and the alkyl group contained in the alkylphenyl group and the alkylnaphthyl group have preferably 2 to 20 carbon atoms.

Examples of the component (D) include an alkyl carboxylic acid, a phosphoric acid monoester, a phosphoric acid diester, an alkylbenzenecarboxylic acid, an alkylbenzenephosphonic acid, and the like. The alkylbenzenecarboxylic acid is a compound represented by R-Ph-COOH, and the alkylbenzenephosphonic acid is a compound represented by R-Ph-$PO(OH)_2$ (wherein R represents an alkyl group, and Ph represents a phenyl group).

The alkyl group of the alkylcarboxylic acid, the alkylbenzenecarboxylic acid and the alkylbenzenephosphonic acid has preferably 2 to 20 carbon atoms. The phosphoric acid monoester and the phosphoric acid diester are preferably an ester obtained from phosphoric acid and an alcohol having 2 to 20 carbon atoms.

Specific examples of the component (D) include propionic acid, DL-2-methylbutyric acid, 2-methylvaleric acid, 2-ethylhexanoic acid, 3,5,5-trimethylhexanoic acid, myristic acid, monomethyl phosphate, dimethyl phosphate, mixture of monomethyl phosphate and dimethyl phosphate, monoethyl phosphate, diethyl phosphate, mixture of monoethyl phosphate and diethyl phosphate, monoisopropyl phosphate, diisopropyl phosphate, mixture of monoisopropyl phosphate and diisopropyl phosphate, monobutyl phosphate, dibutyl phosphate, mixture of monobutyl phosphate and dibutyl phosphate, mono(2-ethylhexyl) phosphate, di(2-ethylhexyl) phosphate, mixture of mono(2-ethylhexyl) phosphate and di(2-ethylhexyl) phosphate, and the like.

The amount of component (D) is preferably 0.1 to 70% by mass in the polyaniline composition, more preferably 0.5 to 70% by mass, still more preferably 1 to 30% by mass, and still more preferably 2 to 20% by mass.

[Component (E): Heat-Resistant Stabilizer]

Examples of the heat-resistant stabilizer (the component (E)) include an acidic substance or a salt of an acidic substance. Provided that, the component (E) does not include the components (D) and (F). The acidic substance may be any of an organic acid having one or more sulfonic acid groups (an acid of an organic compound) and an inorganic acid (an acid of an inorganic compound).

The acidic substance may be any of an organic acid being an acid of an organic compound and an inorganic acid being an acid of an inorganic compound, and is preferably an organic acid.

The acidic substance is preferably an organic acid having one or more sulfonic acid groups.

The organic acid having the above sulfonic acid group is preferably a cyclic, chain or branched alkyl sulfonic acid, a substituted or unsubstituted aromatic sulfonic acid, or a polysulfonic acid, having one or more sulfonic acid groups.

Examples of the alkyl sulfonic acid include methanesulfonic acid, ethanesulfonic acid, di(2-ethylhexyl) sulfosuccinic acid, and the like. Here, the alkyl group is preferably a linear or branched alkyl group having 1 to 18 carbon atoms.

Examples of the aromatic sulfonic acid include those having 6 to 20 carbon atoms, and examples thereof include sulfonic acid having a benzene ring, sulfonic acid having a naphthalene skeleton, and sulfonic acid having an anthracene skeleton. Further, examples of the aromatic sulfonic acid include a substituted or unsubstituted benzenesulfonic acid, a substituted or unsubstituted naphthalenesulfonic acid, and a substituted or unsubstituted anthracenesulfonic acid.

The substituent is, for example, a substituent selected from the group consisting of an alkyl group (having, for example, 1 to 20 carbon atoms), an alkoxy group (having, for example, 1 to 20 carbon atoms), a hydroxy group, a nitro group, a carboxy group, and an acyl group, and may be substituted by one or more of these substituents.

Specific examples of the aromatic sulfonic acid include a compound represented by the following formula (4) or (5).

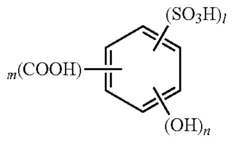

(4)

wherein in the formula (4), l is an integer of 1 or more and 6 or less, m is an integer of 0 or more and 5 or less, n is an integer of 0 or more and 5 or less, and when one of m and n is 0, the other is 1 or more.

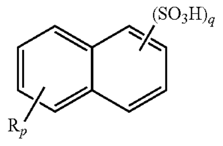

(5)

wherein in the formula (5), q is an integer of 1 or more and 8 or less, p is an integer of 0 or more and 7 or less, and R is independently an alkyl group having 1 to 20 carbon atoms, a carboxy group, a hydroxyl group, a nitro group, a cyano group, an amino group.

l is preferably 1 to 3. m is preferably 1 to 3. n is preferably 0 to 3.

q is preferably 1 to 3. p is preferably 0 to 3. R is preferably an alkyl group having 1 to 20 carbon atoms, a carboxy group, a hydroxyl group.

Examples of the aromatic sulfonic acid include 4-sulfophthalic acid, 5-sulfoisophthalic acid, 5-sulfosalicylic acid, 1-naphthalenesulfonic acid, 2-naphthalenesulfonic acid, 2-hydroxy-6-naphthalenesulfonic acid, p-phenolsulfonic acid, toluenesulfonic acid, p-xylene-2-sulfonic acid, 4,4'-biphenyldisulfonic acid, dibenzofuran-2-sulfonic acid, flavianic acid, (+)-10-camphorsulfonic acid, monoisopropylnaphthalenesulfonic acid, 1-pyrenesulfonic acid, and the like. Among these, in terms of improving heat resistance, 4-sulfophthalic acid, 5-sulfosalicylic acid, 5-sulfoisophthalic acid, 2-naphthalenesulfonic acid, dibenzofuran-2-sulfonic acid, flavianic acid, 2-hydroxy-6-naphthalenesulfonic acid and 1-pyrenesulfonic acid are preferable.

Examples of the salt of the acidic substance include a salt of the above mentioned compound. Examples of a counter ion of the salt include sodium, lithium, potassium, cesium, ammonium, calcium, barium, and the like.

The component (E) may be a hydrate.

The amount of component (E) is preferably 0.1 to 1000 parts by mass based on 100 parts by mass of the component (A), more preferably 1 to 100 parts by mass, and still more preferably 1 to 30 parts by mass.

The component (E), for example, may be contained in the polyaniline composition before forming a coating film by using the polyaniline composition, or may be contained in a coating film after forming the coating film by using the polyaniline composition. In the latter case, the component (E) can be contained in the coating film by allowing the coating film to come in contact with a liquid containing the component (E) (also referred to as "heat-resistant stabilizer-containing liquid"). The contact can be conducted, for example, by immersing the coating film in the heat-resistant stabilizer-containing liquid.

When the heat-resistant stabilizer-containing liquid is used, as the component (E), the sulfonate represented by the formula (4) or the salt thereof is preferable.

The heat-resistant stabilizer-containing liquid may include a solvent.

The solvent is not particularly limited as long as the component (E) is dissolved, and may include water, an alcohol-based solvent, a ketone-based solvent, an ether-based solvent, an ester-based solvent, and the like. One may be used, or two or more thereof may be used in a mixture.

Specific examples of the solvent include methanol, ethanol, isopropanol, n-butanol, 1-methoxy-2-propanol, 3-methoxy-1-butanol, 3-methoxy-3-methylbutanol, 1-ethoxy-2-propanol, ethyl acetate, butyl acetate, methyl isobutyl ketone (MIBK), methyl ethyl ketone (MEK), ethylene glycol mono tert-butyl ether, propylene glycol monomethyl ether acetate, dipropylene glycol monomethyl ether, and the like.

The concentration of the component (E) in the heat-resistant stabilizer-containing liquid is preferably 0.1% by mass to 10% by mass, more preferably 0.3% by mass to 6% by mass, and still more preferably 0.7% by mass to 3.5% by mass.

The contact (immersion) time of the coating film and the heat-resistant stabilizer-containing liquid is preferably 1 minute or more, more preferably 3 minutes or more and 200 minutes or less. The temperature during contact (immersion) is preferably 5° C. to 50° C.

Drying after contact (immersion) is preferably conducted by an oven, a hot plate, or the like.

The drying temperature is preferably 80 to 200° C., more preferably 100 to 170° C.

The drying time is preferably to 180 minutes, more preferably from 3 to 60 minutes. If necessary, heating may be conducted under reduced pressure. The drying temperature and the drying time are not particularly limited, and may be appropriately selected depending on the material used.

As described above, the component (E) may be contained in the polyaniline composition before forming the coating film by using the polyaniline composition, or may be contained in the coating film after forming the coating film by using the polyaniline composition. Further, the component (E) may be contained in the polyaniline composition before forming the coating film by using the polyaniline composition, and then be further additionally contained in the coating film after forming the coating film by using the polyaniline composition.

That is, in one embodiment, the polyaniline composition includes the component (E) contained therein before forming the coating film (hereinafter, sometimes referred to as component (E1)) and the component (E) contained after forming a coating film (hereinafter, sometimes referred to as component (E2)). In such a case, the components (E1) and (E2) may be the same as or different from each other. When being different from each other, for example, the component (E1) is the compound represented by the above formula (5), and the component (E2) is the compound represented by the above formula (4).

In one embodiment, the heat-resistant stabilizer-containing liquid contains the component (B) in addition to the component (E) and the solvent described above. As a result, the heat resistance stability and mechanical strength of the coating film can be improved.

The concentration of the component (B) in the heat-resistant stabilizer-containing liquid is not particularly limited.

In one embodiment, the concentration of the component (B) in the heat-resistant stabilizer-containing liquid is 0.1% by mass or more, 0.5% by mass or more, 1% by mass or more, 2% by mass or more, 3% by mass or more, or 5% by mass or more, and is also 90% by mass or less, 80% by mass or less, 70% by mass or less, 60% by mass or less, 50% by mass or less, 40% by mass or less, 30% by mass or less, or 20% by mass or less.

The concentration of the component (B) in the heat-resistant stabilizer-containing liquid is preferably 5% by mass to 20% by mass. As a result, the mechanical strength of the coating film can be further satisfactorily improved.

As described above, while a case in which a coating film is mainly formed has been described as an example for a method for containing the component (E), a similar method also applies for a case in which a polyaniline-containing porous body is formed.

In addition, in one embodiment, a method for producing a polyaniline composition includes producing a polyaniline-containing material (e.g., a coating film or a polyaniline-containing porous body) using a polyaniline composition without the component (B), and contacting the polyaniline-containing material with the heat-resistant stabilizer-containing liquid containing the component (B). In this manner, after producing the polyaniline-containing material, the component (B) may be incorporated into the polyaniline-containing material to produce the polyaniline composition according to an aspect of the present invention. In addition, in the present embodiment, a liquid containing the component (B) (not containing the heat-resistant stabilizer) may be used instead of the heat-resistant stabilizer-containing liquid containing component (B).

[Component (F): Phenolic Compound]

In one embodiment, the polyaniline composition includes a phenolic compound.

The phenolic compound (the component (F)) is not particularly limited, and is a compound represented by ArOH (wherein Ar is an aryl group or a substituted aryl group). The component (F) is a component different from the components (C) to (E).

Specific examples thereof include phenol, substituted phenols such as o-, m- or p-cresol, o-, m- or p-ethylphenol, o-, m- or p-propylphenol, o-, m- or p-butylphenol, o-, m- or p-chlorophenol, salicylic acid, hydroxybenzoic acid and hydroxynaphthalene; polyvalent phenolic compound such as catechol and resorcinol; and polymeric compound such as phenolic resin, polyphenol and poly(hydroxystyrene), and the like.

Further, a phenolic compound represented by the following formula (6) can be used.

(6)

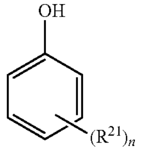

wherein in the formula (6), n is an integer of 1 to 5; when n is 2 or more, the plurality of $R^{21}$'s may independently be the same as or different from each other;

$R^{21}$ is independently an alkyl group having 2 to 10 carbon atoms, an alkenyl group having 2 to 20 carbon atoms, an alkylthio group having 1 to 20 carbon atoms, a cycloalkyl group having 3 to 10 carbon atoms, an aryl group having 6 to 20 carbon atoms, an alkylaryl group having 7 to 20 carbon atoms, or an arylalkyl group having 7 to 20 carbon atoms.

Examples of the alkyl group for $R^{21}$ include methyl, ethyl, propyl, isopropyl, butyl, isobutyl, tertiary butyl, tertiary amyl, and the like.

Examples of the alkenyl group include a substituent having an unsaturated bond in the molecular of the alkyl group described above.

Examples of the cycloalkyl group include cyclopentane, cyclohexane, and the like.

Examples of the alkylthio group include methylthio, ethylthio, and the like.

Examples of the aryl group include phenyl, naphthyl, and the like.

Examples of the alkylaryl group and the arylalkyl group include a substitute obtained by combining the alkyl group and aryl group described above, and the like.

Among these groups, as $R^{21}$, a methyl or ethyl group are preferable.

Further, a phenolic compound represented by the following formula (7) can be used.

(7)

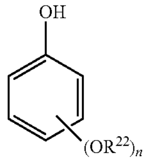

wherein in the formula (7), n is an integer of 1 to 5, preferably 1 to 3, and more preferably 1; when n is 2 or more, the plurality of $R^{22}$'s may independently be the same as or different from each other; $R^{22}$ are an alkyl group having 1 to 20 carbon atoms, an alkenyl group, a cycloalkyl group, an aryl group, an alkylaryl group or an arylalkyl group.

In the phenolic compound represented by the formula (7), the bonding position of $-OR^{22}$ is preferably a meth position or a para position with respect to the phenolic hydroxyl group. When the meta position or the para position is selected for the bonding position of $-OR^{22}$, steric hindrance of the phenolic hydroxyl group can be reduced, and conductivity of the composition can be further enhanced.

Specific examples of the phenolic compound represented by the formula (7) include methoxyphenol (e.g., 4-methoxyphenol), ethoxyphenol, propoxyphenol, isopropoxyphenol, butyloxyphenol, isobutyloxyphenol, and tertiary butyloxyphenol.

The amount of component (F) is 1 to 80% by mass in the polyaniline composition, more preferably 5 to 60% by mass, and still more preferably 10 to 40% by mass. When the phenolic compound is used, it is preferable since the conductivity is improved or the solubility in alcohol is improved.

Further, the component (F) may be mixed with the component (C), and they may be used as a mixed solvent. In such a case, the concentration of the component (A) based on the solvent is calculated by using based on the combined mass of the component (C) and the component (F).

[Component (G): Inorganic Filler]

The inorganic filler is not particularly limited, and examples thereof include particles, fibrous fine particles or the like, containing one or more selected from the group consisting of carbon, silica, titania, alumina, carbon and metal (Ag, Cu and the like).

When the inorganic filler is included in the polyaniline composition, for example, the strength, the surface hardness and the dimensional stability can be improved, and the electrical property such as the conductivity can also be improved.

[Component (H): Binder Resin]

The binder resin is not liquid at 30° C., and is distinguished from the liquid polymer.

The binder resin is not particularly limited, and examples thereof include a polyolefin such as polyethylene and polypropylene, a chlorinated polyolefin, a polystyrene, a polyester, a polyamide, a polyacetal, a polyethylene terephthalate, a polycarbonate, a polyethylene glycol, a polyethylene oxide, a polyacrylic acid, a polyacrylic acid ester, a polymethacrylic acid ester, a polyvinyl alcohol, an epoxy resin, a phenolic resin, a polyvinyl acetal resin, and the like.

[Composition]

In one embodiment, 50% by mass or more, 60% by mass or more, 70% by mass or more, 80% by mass or more, 90% by mass or more, 95% by mass or more, 97% by mass or more, 98% by mass or more, 99% by mass or more, 99.5% by mass or more, 99.7% by mass or more, or essentially 100% by mass (which may contain unavoidable impurities), of the polyaniline composition may consist of the polyaniline complex, the liquid polymer, and optionally one or more selected from the other components described above (e.g., the components (C) to (H)).

In one embodiment, the polyaniline composition consists essentially of the polyaniline complex, the liquid polymer, and optionally one or more selected from the other components described above (e.g., the components (C) to (H)). In such a case, an unavoidable impurity may be contained therein.

In one embodiment, the polyaniline composition consists of only the polyaniline complex, the liquid polymer, and optionally one or more selected from the other components described above (e.g., the components (C) to (H)).

[Coat Film]

A coating film according to an aspect of the present invention includes the polyaniline composition according to an aspect of the present invention described above.

The film thickness of the coating film is not particularly limited, and can be appropriately selected depending on the purpose and the application.

[Polyaniline-Containing Porous Body]

Further, a polyaniline-containing porous body according to an aspect of the present invention includes a porous body and the polyaniline composition according to an aspect of the present invention described above contained in the porous body.

The polyaniline-containing porous body can be produced, for example, by permeating the polyaniline composition containing the component (C) into the porous body, and then drying the component (C).

The porous body is a material with fine pores, and preferably has any of the multitude of fine pores having the diameters of about 1 nm to 10 μm on the surface thereof.

Examples of the porous body include, for example, an oxide porous body of a metal (e.g., aluminum, tantalum, niobium, titanium, hafnium, zirconium, zinc, tungsten, bismuth, antimony), a zeolite, an activated carbon, and a mesoporous silica.

The shape of the porous body is not particularly limited, and is, for example, a molded body or a film (a foil) and one having a certain thickness.

Specific examples of the porous body include, for example, a molded body consisting of only an oxide of a metal (e.g., a spherical body composed of aluminum oxide having fine pores (alumina ball)). Further, a film (a foil) composed of an oxide of metal (e.g., a film (a foil) composed of aluminum having an etching hole by roughening, and aluminum oxide formed on the surface thereof (an anode material for an aluminum electrolytic capacitor), and a film composed of a sintered body of tantalum fine particles, and tantalum pentoxide formed on the surface thereof (an anode material for a tantalum capacitor) can be given.

A polyaniline-containing porous body in which the polyaniline composition is contained in the porous body is suitable, for example, as a solid electrolyte of a solid electrolytic capacitor.

[Application]

The application of the polyaniline composition is not particularly limited, and it can be applied to various applications.

The polyaniline composition is used, for example, as a conductive ink or a coating agent, and the obtained coating film is suitable as a solid electrolyte of a capacitor, an electromagnetic wave absorbing coating agent, an antistatic coating agent, an electrolytic plating undercoat, a circuit wiring application, and the like.

The polyaniline composition can be used, for example, as a solid electrolyte of a capacitor, an electromagnetic wave absorbing coating agent, an antistatic coating agent, an electrolytic plating undercoat, a conductive ink for circuit wiring application or the like, and the like.

EXAMPLES

Examples of the present invention will be described below, but the present invention is not limited by the Examples.

Production Example 1

32.4 g of Neocol SWC (manufactured by DKS Co. Ltd., sodium di-2-ethylhexylsulfosuccinate), 13.3 g of aniline and 0.9 g of Sorbon T-20 (manufactured by TOHO Chemical Industry Co., Ltd., a nonionic emulsifier having a polyoxyethylene sorbitan fatty acid ester structure) were added to a 1,000 ml separable flask, and dissolved by 320.4 g of toluene. 450 g of a 17% by mass aqueous solution of phosphoric acid was added thereto, and the reaction solution with two liquid phases of an aqueous phase and a toluene phase was stirred, and the internal temperature of the reaction solution was cooled to −5° C. When the internal temperature of the reaction solution reached −5° C., a solution in which 39.3 g of ammonium persulfate (APS) was dissolved in 90.2 g of a 17% by mass aqueous solution of phosphoric acid was added dropwise, with stirring, using a dropping funnel over 1 hours. Following completion of the dropwise addition, the solution was further stirred for 8 hours (total reaction time of 9 hours) with maintaining the internal temperature of the solution at −5° C. After stopping the stirring, the contents were transferred to a separatory funnel, and the aqueous phase and the toluene phase were statically separated. Following the separation, the toluene phase was washed once with 180.3 g of a 8.5% by mass aqueous solution of phosphoric acid and five times with 328.0 g of an ion-exchanged water to obtain a toluene solution of a polyaniline complex. This solution was filtered through a filter paper of No. 2 to remove insoluble fractions, and the toluene solution of the polyaniline complex soluble in toluene was collected. The solution was transferred to an evaporator, warmed in a water bath at 60° C., and decompressed, whereby the volatiles were evaporated and removed to obtain the polyaniline complex.

Example 1

[Preparation of Polyaniline Composition]

36 g of 1-methoxy-2-propanol (manufactured by Tokyo Chemical Industry Co., Ltd.), 40 g of p-tert-amylphenol (manufactured by FUJIFILM Wako Pure Chemical Corporation), and 24 g of Kyowa Zole C-900 (manufactured by KH Neochem Co., Ltd., isomeric mixture of C9-alkane) were stirred and mixed until uniform to prepare a mixed solvent. 7 g of the polyaniline complex obtained in Production Example 1 was added to 93 g of the mixed solvent and uniformly dissolved to prepare a polyaniline complex solution containing 7% by mass of the polyaniline complex. Thereafter, 0.526 g of 2-naphthalenesulfonic acid hydrate, and 0.7 g of SC-E1500 (manufactured by Sakamoto Yakuhin Kogyo Co., Ltd., polyoxyethylene polyglyceryl ether, average molecular weight: 1,500) were added to 100 g of the polyaniline complex solution and uniformly dissolved to obtain a polyaniline composition.

[Preparation of Coating Film]

1.2 g of the obtained polyaniline composition was applied onto a silicon petri dish, dried at 100° C. for an hour, and then dried at 150° C. for 3 hours to prepare a coating film. The thickness of the coating film after drying solvents was 40 μm.

Measurement and Evaluation Method

[Viscosity Measurement of Liquid Polymer]

The viscosity of the liquid polymer used in the Examples and Comparative Examples is a value measured using a rotary viscometer (manufactured by VISCOTECH CO., LTD., "Fungilab-α") under the following conditions.

Sample temperature: 30° C.

Spindle: TL7 (manufactured by VISCOTECH CO., LTD.)

Rotation speed: 0.5 rpm (fixed)

All of the liquid polymers used in the Examples and Comparative Examples are liquid at 30° C.

[Tensile Test of Coating Film]

The resulting coating film was cut into a strip with 7 mm of wide and 3 cm of length, and then a tensile test was conducted using a small tabletop tensile tester (EZGraph, manufactured by Shimadzu Corporation) by pulling the coating film at a rate of displacement 1 mm/min to measure elongation rate when the coating film was broken. The higher the elongation rate, the more excellent the mechanical strength is evaluated.

Example 2

A coating film (film thickness: 24 μm) was prepared and evaluated in the same manner as in Example 1, except that the amount of SC-E1500 was changed to 1.4 g.

Example 3

A coating film (film thickness: 31 μm) was prepared and evaluated in the same manner as in Example 1, except that the amount of SC-E1500 was changed to 2.1 g.

Example 4

A coating film (film thickness: 44 μm) was prepared and evaluated in the same manner as in Example 1, except that the amount of SC-E1500 was changed to 3.5 g.

Example 5

A coating film (film thickness: 22 μm) was prepared and evaluated in the same manner as in Example 1, except that SC-E350 (manufactured by Sakamoto Yakuhin Kogyo Co., Ltd., polyoxyethylene polyglyceryl ether, average molecular weight: 350) was used instead of SC-E1500.

Example 6

A coating film (film thickness: 28 μm) was prepared and evaluated in the same manner as in Example 1, except that SC-P750 (manufactured by Sakamoto Yakuhin Kogyo Co., Ltd., polyoxypropylene glycol ether, average molecular weight: 750) was used instead of SC-E1500.

Example 7

A coating film (film thickness: 27 μm) was prepared and evaluated in the same manner as in Example 1, except that SC-P1000 (manufactured by Sakamoto Yakuhin Kogyo Co., Ltd., polyoxypropylene glycol ether, average molecular weight: 1,000) was used instead of SC-E1500.

Example 8

A coating film (film thickness: 27 μm) was prepared and evaluated in the same manner as in Example 1, except that SC-P1600 (manufactured by Sakamoto Yakuhin Kogyo Co., Ltd., polyoxypropylene glycol ether, average molecular weight: 1,600) was used instead of SC-E1500.

Example 9

A coating film (film thickness: 29 μm) was prepared and evaluated in the same manner as in Example 1, except that 0.14 g of ARUFON UP1110 (manufactured by TOAGOSEI CO., LTD., acrylic polymer, weight average molecular weight Mw: 2,500) was used instead of SC-E1500.

Example 10

A coating film (film thickness: 43 μm) was prepared and evaluated in the same manner as in Example 1, except that 0.35 g of ARUFON UP1110 was used instead of SC-E1500.

Example 11

A coating film (film thickness: 33 μm) was prepared and evaluated in the same manner as in Example 1, except that 0.7 g of ARUFON UP1110 was used instead of SC-E1500.

Example 12

A coating film (film thickness: 33 μm) was prepared and evaluated in the same manner as in Example 1, except that 1.4 g of ARUFON UP1110 was used instead of SC-E1500.

Example 13

A coating film (film thickness: 38 μm) was prepared and evaluated in the same manner as in Example 1, except that 2.1 g of ARUFON UP1110 was used instead of SC-E1500.

Example 14

A coating film (film thickness: 34 μm) was prepared and evaluated in the same manner as in Example 1, except that 1.4 g of ARUFON UP1000 (manufactured by TOAGOSEI CO., LTD., acrylic polymer, weight average molecular weight Mw: 3,000) was used instead of SC-E1500.

Example 15

A coating film (film thickness: 33 μm) was prepared and evaluated in the same manner as in Example 1, except that 1.4 g of ARUFON UP1010 (manufactured by TOAGOSEI CO., LTD., acrylic polymer, weight average molecular weight Mw: 1,700) was used instead of SC-E1500.

Example 16

A coating film (film thickness: 31 μm) was prepared and evaluated in the same manner as in Example 1, except that 1.4 g of ARUFON UP1021 (manufactured by TOAGOSEI CO., LTD., acrylic polymer, weight average molecular weight Mw: 1,600) was used instead of SC-E1500.

Example 17

A coating film (film thickness: 32 μm) was prepared and evaluated in the same manner as in Example 1, except that 0.14 g of Poly Bd® R-15HT (manufactured by Idemitsu Kosan Co., Ltd., polybutadiene, number average molecular weight Mn: 1,200) was used instead of SC-E1500.

Example 18

A coating film (film thickness: 40 μm) was prepared and evaluated in the same manner as in Example 1, except that 0.35 g of Poly Bd® R-15HT was used instead of SC-E1500.

Example 19

A coating film (film thickness: 31 μm) was prepared and evaluated in the same manner as in Example 1, except that 0.7 g of Poly Bd® R-15HT was used instead of SC-E1500.

Example 20

A coating film (film thickness: 29 μm) was prepared and evaluated in the same manner as in Example 1, except that 0.14 g of Poly Bd® R-45HT (manufactured by Idemitsu Kosan Co., Ltd., polybutadiene, number average molecular weight Mn: 2,800) was used instead of SC-E1500.

Example 21

A coating film (film thickness: 40 μm) was prepared and evaluated in the same manner as in Example 1, except that 0.35 g of Poly Bd® R-45HT was used instead of SC-E1500.

Example 22

A coating film (film thickness: 32 μm) was prepared and evaluated in the same manner as in Example 1, except that 0.14 g of Poly Ip® (manufactured by Idemitsu Kosan Co., Ltd., polyisoprene, number average molecular weight Mn: 2,500) was used instead of SC-E1500.

Example 23

A coating film (film thickness: 25 μm) was prepared and evaluated in the same manner as in Example 1, except that 0.35 g of Poly Ip® was used instead of SC-E1500.

Example 24

A coating film (film thickness: 37 μm) was prepared and evaluated in the same manner as in Example 1, except that 0.7 g of EPOL® (manufactured by Idemitsu Kosan Co., Ltd., hydroxyl group-terminated liquid polyolefin, number average molecular weight Mn: 2,500) was used instead of SC-E1500.

Example 25

A coating film (film thickness: 50 μm) was prepared and evaluated in the same manner as in Example 1, except that 1.4 g of EPOL® was used instead of SC-E1500.

Comparative Example 1

A coating film (film thickness: 20 μm) was prepared and evaluated in the same manner as in Example 1, except that SC-E1500 was not added.

The above results are shown in Table 1. In Table 1, "Amount of Liquid polymer [parts by mass]" is a value based on 100 parts by mass of the polyaniline complex.

TABLE 1

| | Liquid polymer | | | Mechanical |
|---|---|---|---|---|
| | Member | Viscosity [Pa · s] | Amount [parts by mass] | strength (elongation rate) [%] |
| Example 1 | SC-E1500 | 1.2 | 10 | 6.4 |
| Example 2 | SC-E1500 | 1.2 | 20 | 10.5 |
| Example 3 | SC-E1500 | 1.2 | 30 | 22.7 |
| Example 4 | SC-E1500 | 1.2 | 50 | 35.7 |
| Example 5 | SC-E350 | 0.42 | 10 | 3.7 |
| Example 6 | SC-P750 | 0.18 | 10 | 2.5 |
| Example 7 | SC-P1000 | 1.1 | 10 | 3.1 |
| Example 8 | SC-P1600 | 0.27 | 10 | 3.0 |
| Example 9 | UP1110 | 1.5 | 2 | 2.4 |
| Example 10 | UP1110 | 1.5 | 5 | 4.4 |
| Example 11 | UP1110 | 1.5 | 10 | 5.6 |
| Example 12 | UP1110 | 1.5 | 20 | 4.0 |
| Example 13 | UP1110 | 1.5 | 30 | 3.7 |
| Example 14 | UP1000 | 2.0 | 20 | 6.3 |
| Example 15 | UP1010 | 2.8 | 20 | 7.2 |

TABLE 1-continued

| | Liquid polymer | | | Mechanical |
|---|---|---|---|---|
| | Member | Viscosity [Pa · s] | Amount [parts by mass] | strength (elongation rate) [%] |
| Example 16 | UP1021 | 0.15 | 20 | 6.8 |
| Example 17 | R-15HT | 3.9 | 2 | 3.9 |
| Example 18 | R-15HT | 3.9 | 5 | 4.8 |
| Example 19 | R-15HT | 3.9 | 10 | 2.5 |
| Example 20 | R-45HT | 6.6 | 2 | 2.0 |
| Example 21 | R-45HT | 6.6 | 5 | 2.7 |
| Example 22 | polyip | 10.3 | 2 | 2.7 |
| Example 23 | polyip | 10.3 | 5 | 3.1 |
| Example 24 | EP0L | 92.7 | 10 | 6.8 |
| Example 25 | EP0L | 92.7 | 20 | 4.3 |
| Comparative Example 1 | — | — | — | 1.8 |

Evaluation

From Table 1, it is found that a coating film produced using a polyaniline composition containing a polyaniline complex and a liquid polymer exhibits excellent mechanical strength.

Example 26

[Preparation of Heat-Resistant Stabilizer-Containing Solution C]

98 g of 1-methoxy-2-propanol (manufactured by Tokyo Chemical Industry Co., Ltd.) and 2 g of a 50% by mass aqueous solution of 4-sulfophthalic acid were mixed to obtain a heat-resistant stabilizer-containing liquid C.

[Immersion Treatment]

The coating film obtained in Example 1 was immersed in 10 g of the obtained heat-resistant stabilizer-containing liquid C for 10 minutes. Thereafter, the coating film was taken out from the solution and dried at 170° C. for 1 hour to obtain a heat-resistant stabilizer-containing coating film (film thickness: 43 μm).

The obtained heat-resistant stabilizer-containing coating film was evaluated in the same manner as in Example 1.

Example 27

[Preparation of Coating Film]

A coating film was prepared in the same manner as in Example 1, except that the amount of SC-E1500 was changed to 0.35 g.

[Preparation of Heat-Resistant Stabilizer-Containing Liquid D]

88 g of 1-methoxy-2-propanol (manufactured by Tokyo Chemical Industry Co., Ltd.), 10 g of SC-E1500, and 2 g of a 50% by mass aqueous solution of 4-sulfophthalic acid were mixed to obtain a heat-resistant stabilizer-containing liquid D.

[Immersion Treatment]

The coating film obtained in the above was immersed in 10 g of the obtained heat-resistant stabilizer-containing liquid D for 10 minutes. Thereafter, the coating film was taken out from the solution and dried at 170° C. for an hour to obtain a heat-resistant stabilizer-containing coating film (film thickness: 26 μm).

The obtained heat-resistant stabilizer-containing coating film was evaluated in the same manner as in Example 1.

Example 28

The coating film obtained in Example 1 was subjected to immersion treatment in the same manner as in Example 27 (heat-resistant stabilizer-containing liquid D). The obtained heat-resistant stabilizer-containing coating film (film thickness: 55 μm) was evaluated in the same manner as in Example 1.

Example 29

The coating film obtained in Example 2 was subjected to immersion treatment in the same manner as in Example 27 (heat-resistant stabilizer-containing liquid D). The obtained heat-resistant stabilizer-containing coating film (film thickness: 53 μm) was evaluated in the same manner as in Example 1.

Example 30

The coating film obtained in Example 11 was subjected to immersion treatment in the same manner as in Example 26 (heat-resistant stabilizer-containing liquid C). The obtained heat-resistant stabilizer-containing coating film (film thickness: 44 μm) was evaluated in the same manner as in Example 1.

Example 31

The coating film obtained in Example 19 was subjected to immersion treatment in the same manner as in Example 26 (heat-resistant stabilizer-containing liquid C). The obtained heat-resistant stabilizer-containing coating film (film thickness: 74 μm) was evaluated in the same manner as in Example 1.

Example 32

The coating film obtained in Example 24 was subjected to immersion treatment in the same manner as in Example 26 (heat-resistant stabilizer-containing liquid C). The obtained heat-resistant stabilizer-containing coating film (film thickness: 27 μm) was evaluated in the same manner as in Example 1.

Example 33

The coating film obtained in Example 25 was subjected to immersion treatment in the same manner as in Example 26 (heat-resistant stabilizer-containing liquid C). The obtained heat-resistant stabilizer-containing coating film (film thickness: 54 μm) was evaluated in the same manner as in Example 1.

Comparative Example 2

The coating film obtained in Comparative Example 1 was subjected to immersion treatment in the same manner as in Example 26 (heat-resistant stabilizer-containing liquid C). The obtained heat-resistant stabilizer-containing coating film (film thickness: 35 μm) was evaluated in the same manner as in Example 1.

The above results are shown in Table 2. In Table 2, "Amount of Liquid polymer [parts by mass]" is a value based on 100 parts by mass of the polyaniline complex.

TABLE 2

| | Liquid polymer | | | Presence or absence of liquid polymer in | Mechanical |
|---|---|---|---|---|---|
| | Member | Viscosity [Pa · s] | Amount [parts by mass] | heat-resistant stabilizer-containing solution | strength (elongation rate) [%] |
| Example 26 | SC-E1500 | 1.2 | 10 | Absence | 2.8 |
| Example 27 | SC-E1500 | 1.2 | 5 | Presence | 2.0 |
| Example 28 | SC-E1500 | 1.2 | 10 | Presence | 11.4 |
| Example 29 | SC-E1500 | 1.2 | 20 | Presence | 4.5 |
| Example 30 | UP1110 | 1.5 | 10 | Absence | 3.7 |
| Example 31 | R-15HT | 3.9 | 10 | Absence | 2.1 |
| Example 32 | EP0L | 92.7 | 10 | Absence | 1.7 |
| Example 33 | EP0L | 92.7 | 20 | Absence | 1.7 |
| Comparative Example 2 | — | — | — | Absence | 1.3 |

Evaluation

From Table 2, it is found that a coating film produced using a polyaniline composition containing a polyaniline complex and a liquid polymer exhibits excellent mechanical strength of the coating film (the heat-resistant stabilizer-containing coating film) even after allowing it to come in contact with the heat-resistant stabilizer-containing liquid. Further, it is found that a liquid polymer is contained in a heat-resistant stabilizer-containing liquid, the mechanical strength of the heat-resistant stabilizer-containing coating film can be further improved.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the specification of Japanese application(s) on the basis of which the present application claims Paris convention priority are incorporated herein by reference in its entirety.

The invention claimed is:

1. A polyaniline composition comprising a polyaniline complex composed of a polyaniline doped with a dopant, and a liquid polymer, and wherein the amount of the liquid polymer based on 100 parts by mass of the polyaniline complex is 8 parts by mass to 30 parts by mass.

2. The polyaniline composition according to claim 1, wherein the dopant is a sulfosuccinic acid derivative represented by the following formula (III):

(III)

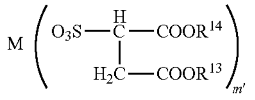

wherein in the formula (III), M is a hydrogen atom, an organic free radical or an inorganic free radical; m' is the valence of M; $R^{13}$ and $R^{14}$ are independently a hydrocarbon group or $—(R^{15}O)_r—R^{16}$ group; $R^{15}$ is independently a hydrocarbon group or a silylene group; $R^{16}$ is a hydrogen atom, a hydrocarbon group or $R^{17}{}_3Si—$ group; r is an integer of 1 or more; and $R^{17}$ is independently a hydrocarbon group.

3. The polyaniline composition according to claim 1, wherein the dopant is di-2-ethylhexylsulfosuccinic acid.

4. The polyaniline composition according to claim 1, wherein the liquid polymer is one or more selected from the group consisting of polyglyceryl ether, acrylic polymer and liquid rubber.

5. The polyaniline composition according to claim 1, which comprises a heat-resistant stabilizer.

6. The polyaniline composition according to claim 1, which comprises a phenolic compound.

7. The polyaniline composition according to claim 1, which comprises a permeability improver.

8. The polyaniline composition according to claim 1, which comprises a solvent.

9. A coating film comprising the polyaniline composition according to claim 1.

10. A polyaniline-containing porous body comprising a porous body and the polyaniline composition according to claim 1 contained in the porous body.

11. A method for producing a coating film comprising contacting the coating film according to claim 9 with a heat-resistant stabilizer-containing liquid.

12. The method for producing a coating film according to claim 11, wherein the heat-resistant stabilizer-containing liquid comprises a liquid polymer.

13. The method for producing a coating film according to claim 12, wherein the concentration of the liquid polymer in the heat-resistant stabilizer-containing liquid is 5% by mass to 20% by mass.

14. A method for producing a polyaniline-containing porous body comprising contacting the polyaniline-containing porous body according to claim 10 with a heat-resistant stabilizer-containing liquid.

15. The method for producing a polyaniline-containing porous body according to claim 14, wherein the heat-resistant stabilizer-containing liquid comprises a liquid polymer.

16. The method for producing a polyaniline-containing porous body according to claim 15, wherein the concentration of the liquid polymer in the heat-resistant stabilizer-containing liquid is 5% by mass to 20% by mass.

* * * * *